United States Patent
Rajappa et al.

(10) Patent No.: US 7,416,235 B2
(45) Date of Patent: Aug. 26, 2008

(54) DUAL SLIDING CENTER CONSOLE

(75) Inventors: Ramakrishnan Rajappa, Sterling Heights, MI (US); Steven M. Jakubiec, Bloomfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/468,312

(22) Filed: Aug. 30, 2006

(65) Prior Publication Data

US 2008/0079278 A1 Apr. 3, 2008

(51) Int. Cl.
*B60N 3/12* (2006.01)
(52) U.S. Cl. .................. 296/37.8; 296/24.34
(58) Field of Classification Search ............. 296/37.8, 296/24.34, 37.14, 37.7; 224/926, 275, 282, 224/281, 929; 248/311.2
See application file for complete search history.

(56) References Cited

U.S. PATENT DOCUMENTS

| | | | | |
|---|---|---|---|---|
| 4,934,750 A * | 6/1990 | Eichler et al. | .............. | 296/37.8 |
| 5,951,084 A * | 9/1999 | Okazaki et al. | .......... | 296/37.16 |
| 6,003,927 A * | 12/1999 | Korber et al. | ............. | 296/37.8 |
| 6,045,173 A * | 4/2000 | Tiesler et al. | .............. | 296/37.8 |
| 6,135,529 A * | 10/2000 | De Angelis et al. | ........ | 296/37.8 |
| 6,203,088 B1 * | 3/2001 | Fernandez et al. | ......... | 296/37.8 |
| 6,367,857 B2 | 4/2002 | Kifer et al. | | |
| 6,419,314 B1 * | 7/2002 | Scheerhorn | ................ | 296/37.8 |
| 6,435,587 B1 * | 8/2002 | Flowerday et al. | ......... | 296/37.8 |
| 6,497,443 B2 * | 12/2002 | Worrell et al. | ............. | 296/37.8 |
| 6,655,561 B2 * | 12/2003 | Barre et al. | ................. | 224/275 |
| 6,669,258 B1 * | 12/2003 | Kato | ........................ | 296/37.8 |
| 6,726,267 B2 * | 4/2004 | Kim et al. | ................ | 296/24.34 |
| 6,736,438 B1 * | 5/2004 | Wieclawski | ................ | 296/37.8 |
| 6,752,444 B2 * | 6/2004 | Kitano et al. | .............. | 296/37.8 |
| 6,921,118 B2 * | 7/2005 | Clark et al. | ............. | 296/24.34 |
| 6,932,402 B2 * | 8/2005 | Niwa et al. | .............. | 296/24.34 |
| 7,004,527 B2 * | 2/2006 | Niwa et al. | .............. | 296/24.34 |
| 7,014,241 B2 * | 3/2006 | Toyota et al. | ............... | 224/275 |
| 7,029,049 B2 * | 4/2006 | Rockafellow et al. | ...... | 296/37.8 |
| 7,104,580 B2 * | 9/2006 | Clark et al. | ............. | 296/24.32 |
| 7,114,772 B2 * | 10/2006 | Kobayashi et al. | ..... | 297/188.04 |
| 7,152,897 B2 * | 12/2006 | Bonnes et al. | ............. | 296/35.1 |
| 2003/0234550 A1 * | 12/2003 | Brooks et al. | .............. | 296/24.1 |
| 2007/0152461 A1 * | 7/2007 | Joler et al. | ............... | 296/24.34 |

* cited by examiner

*Primary Examiner*—Kiran B. Patel
(74) *Attorney, Agent, or Firm*—Ralph E. Smith

(57) ABSTRACT

A storage console assembly for a motor vehicle having a floor comprising a bracket removably coupled to the floor, a lower rail attached to the bracket and a main body slidably engaged with the lower rail. An upper rail attached to a top portion of the main body. An upper body having a top portion and a handle is slidably engaged with the upper rail. The main body is arranged to be moved longitudinally within the vehicle with respect to the bracket, and the upper body is arranged to be moved longitudinally within the vehicle with respect to the bracket and the main body.

14 Claims, 3 Drawing Sheets

DUAL SLIDING CENTER CONSOLE

FIELD OF THE INVENTION

The present invention relates to motor vehicle consoles, and specifically to a multiple-tiered sliding console system for a motor vehicle which can be adjusted longitudinally within the vehicle.

BACKGROUND OF THE INVENTION

Automotive vehicle interiors typically include storage console assemblies positioned in the center of bench type seats or between a pair of bucket type seats. These storage console assemblies, also known as center console assemblies, often act as an armrest for the vehicle passengers and usually include at least one storage compartment. The storage compartment may also include a pivotal lid for accessing the interior of the storage compartment. Finally, the center console assembly may include cup holders accessible to vehicle passengers located next to, or behind the center console assembly.

In recent years, many efforts have been made to increase the flexibility of storage options within a vehicle interior. One such effort has been the provision of removable or slidable center console assemblies that may be positioned alternatively between either the front or the rear passenger seats in a vehicle. For example, U.S. Pat. No. 6,135,529 discloses a center console assembly capable of sliding along a guide member extending longitudinally within the vehicle. Similarly, U.S. Pat. No. 6,203,088 discloses a center console assembly capable of sliding along a stationary rail member attached to the vehicle body and extending longitudinally within the vehicle. Finally, U.S. Pat. No. 6,367,857 discloses removable console assembly which may be attached to one of two mounting assemblies located between the front and rear seats of a vehicle. However, one drawback of such assemblies is that removable center console assemblies are generally unavailable to the second row passengers when the console is in the forward position of the center console assembly within the vehicle and must be removed and reinstalled in a second position within the vehicle to be accessible to the second row passengers. The slidable center console assemblies disclosed in the prior art have a similar disadvantage in that such assemblies require the use a track extending longitudinally within the vehicle which may obstruct the ability of a vehicle occupant to move laterally within the vehicle.

SUMMARY OF THE INVENTION

Accordingly, one aspect of the present invention is to provide a storage console assembly for a motor vehicle that is capable of being repositioned to be accessible to passengers located in both the front and rear passenger seats.

Another aspect of the present invention is to provide a storage console assembly that does not obstruct the ability of a vehicle occupant to move laterally within the vehicle.

In accordance with the foregoing aspects of the invention, a storage console assembly for a motor vehicle having a floor is provided comprising a bracket removably coupled to the floor, a lower rail attached to the bracket and a main body slidably engaged with the lower rail. An upper rail attached to a top portion of the main body. An upper body having a top portion and a handle is slidably engaged with the upper rail. The main body is arranged to be moved longitudinally within the vehicle with respect to the bracket, and the upper body is arranged to be moved longitudinally within the vehicle with respect to the bracket and the main body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
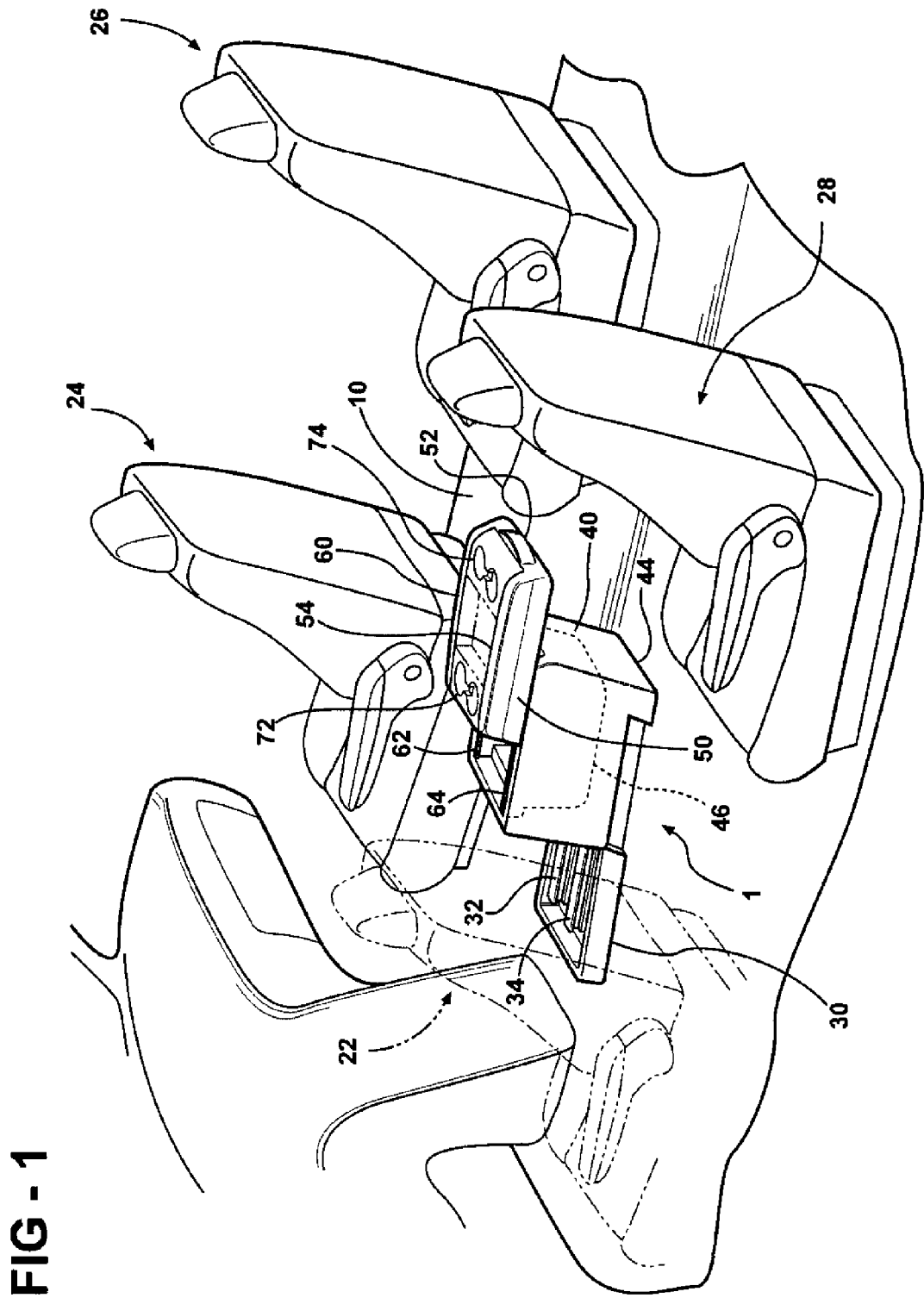
FIG. 1 is a perspective view of a storage console assembly for a motor vehicle according to an exemplary embodiment of the present invention.

Turning now to the drawings, FIG. 1 shows a storage console assembly 1 for a motor vehicle according to an exemplary embodiment of the present invention. The motor vehicle includes a floor 10, a pair of front passenger seats 22 and 24, and a pair of similar rear passenger seats 26 and 28 placed behind the front passenger seats 22 and 24. As those skilled in the art will appreciate, the subject invention is not dependent on any particular type of vehicle or seating arrangement.

The storage console assembly 1 includes a bracket 30 removably coupled to the floor 10 of the vehicle between the front passenger seats 22 and 24. Two lower rails 32 and 34 are attached to the right and left sides of the top portion of the bracket 30. The storage console assembly 1 further includes a main body 40 slidably engaged with the lower rails 32 and 34. Two upper rails 62 and 64 are attached to a top portion of the main body 40. The main body 40 includes a storage bin 46 formed in the interior of the main body 40. Finally, an upper body 50 is slidably engaged with the upper rails 62 and 64. The upper body 50 includes a storage bin 54 formed in the interior of the upper body 50, front and rear cupholders 72 and 74, and a cover 60 pivotally attached to the upper body 50 which functions to permit access to the storage bin 54. The main body 40 is arranged to be moved longitudinally within the vehicle with respect to the bracket 30, and the upper body 50 is arranged to be moved longitudinally within the vehicle with respect to the bracket 30 and the main body 40.

Figure 2:
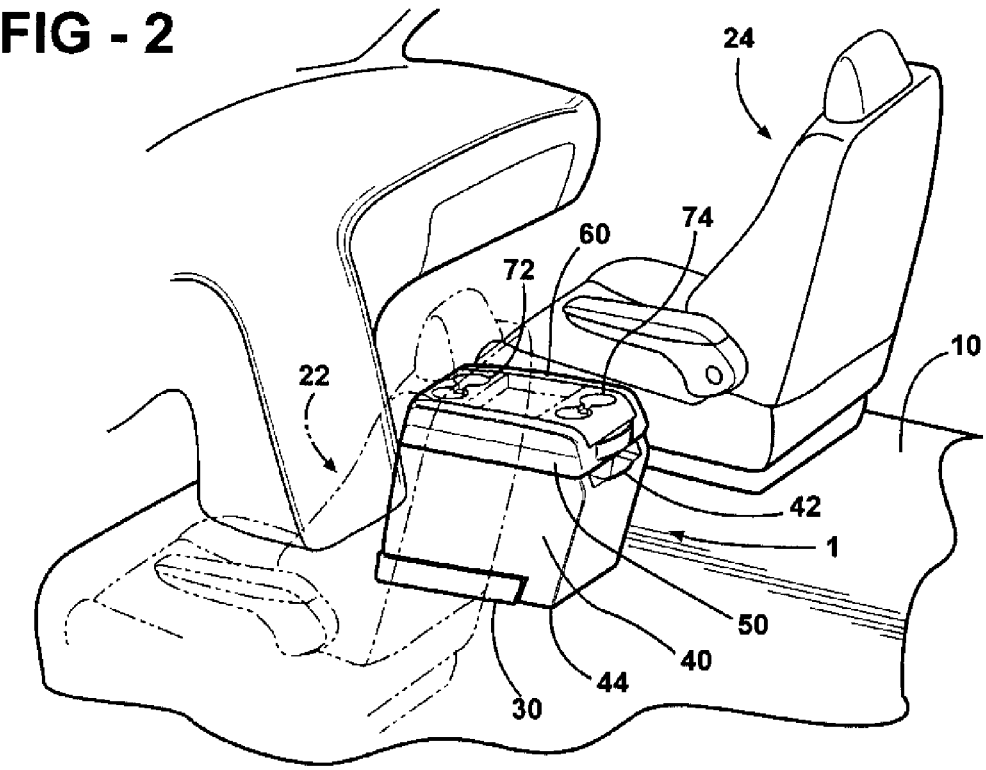
FIG. 2 is a perspective view of a storage console assembly for a motor vehicle according to an exemplary embodiment of the present invention.

As shown in FIGS. 1-5, the upper 62 and 64 and lower rails 32 and 34 permit the main body 40 and the upper body 50 to slide forward and backward within the vehicle independent of both each other and the bracket 30. As shown in FIG. 2, a handle 42 is attached to the main body 40 which functions to bias the main body 40 along the lower rails 32 and 34 between a forward position and a rearward position within the vehicle with respect to the bracket 30. Similarly, as best shown in FIG. 1, a handle 52 is attached to the upper body 50 which functions to bias the upper body 50 along the upper rails 62 and 64 between a forward position and a rearward position within the vehicle with respect to the main body 40. Although the handle 52 is shown in FIG. 1 as positioned on the rearward edge of the upper body 50, it will be appreciated by those skilled in the art that the handle 52 may also be positioned on the forward edge of the upper body 50. The storage console assembly 1 may also include a lip 44 extending downward from a rearward section of the bottom portion of the main body 40 which functions to engage the main body 40 with the floor 10 of the vehicle and support the main body 40 in an upright position when the main body 40 is in its rearward position.

Figure 4:
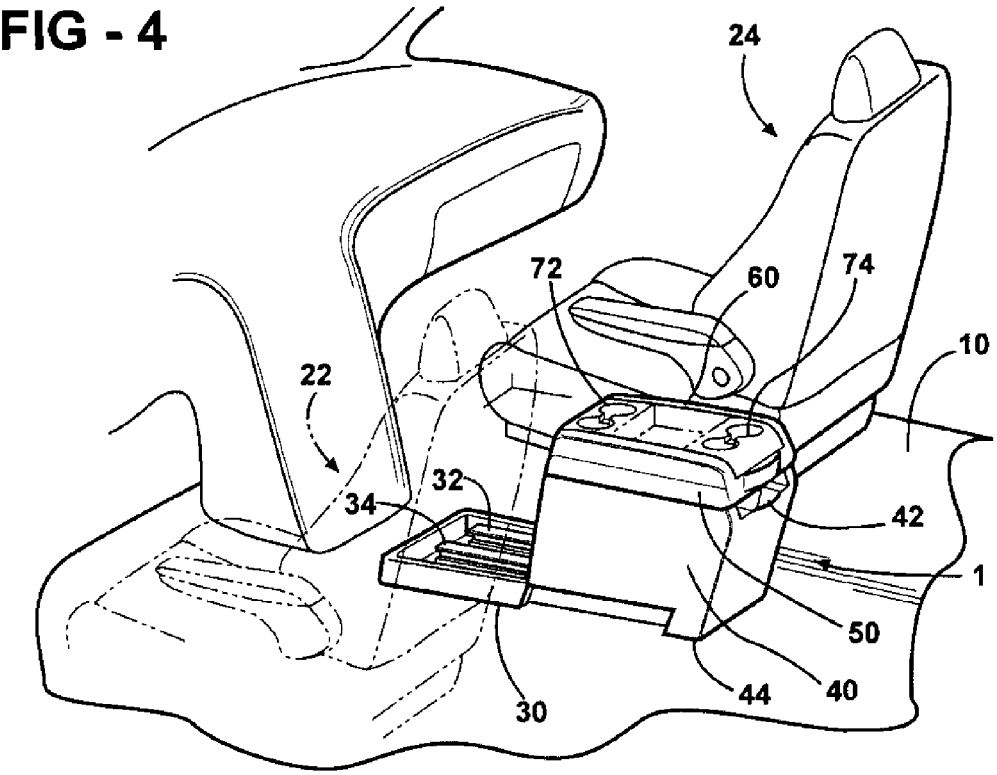
FIG. 4 is a perspective view of a storage console assembly for a motor vehicle according to an exemplary embodiment of the present invention.

In this manner, the storage console assembly 1 is capable of assuming a variety of positions within the vehicle. For example, as shown in FIG. 2, the storage console assembly 1 may assume a full forward position in which the main body 40 and upper body 50 are both in their respective forward positions. When the storage console assembly 1 is in the full forward position a latch system (not shown) located in the storage console assembly 1 locks the upper body 50 in position to prevent the upper body 50 from sliding forward in the vehicle relative to the main body 40. Similarly, as shown in FIG. 1, the storage console assembly 1 may assume a full rearward position in which the main body 40 and the upper body 50 are both in their respective rearward positions. In this position, access is provided to both the upper body 50 of the storage console assembly 1, as well as to the storage bin 46 provided in the main body 40 of the storage console assembly 1. In the event that the access to the storage bin 46 of the main body 40 permitted by the configuration shown in FIG. 1 is not required by the rear passenger seats, the upper body 50 may be biased forward along the upper rails 62 and 64 until the upper body is aligned to cover the storage bin 46 provided in the main body 40 of the storage console assembly 1, as shown in FIG. 4.

Figure 3:
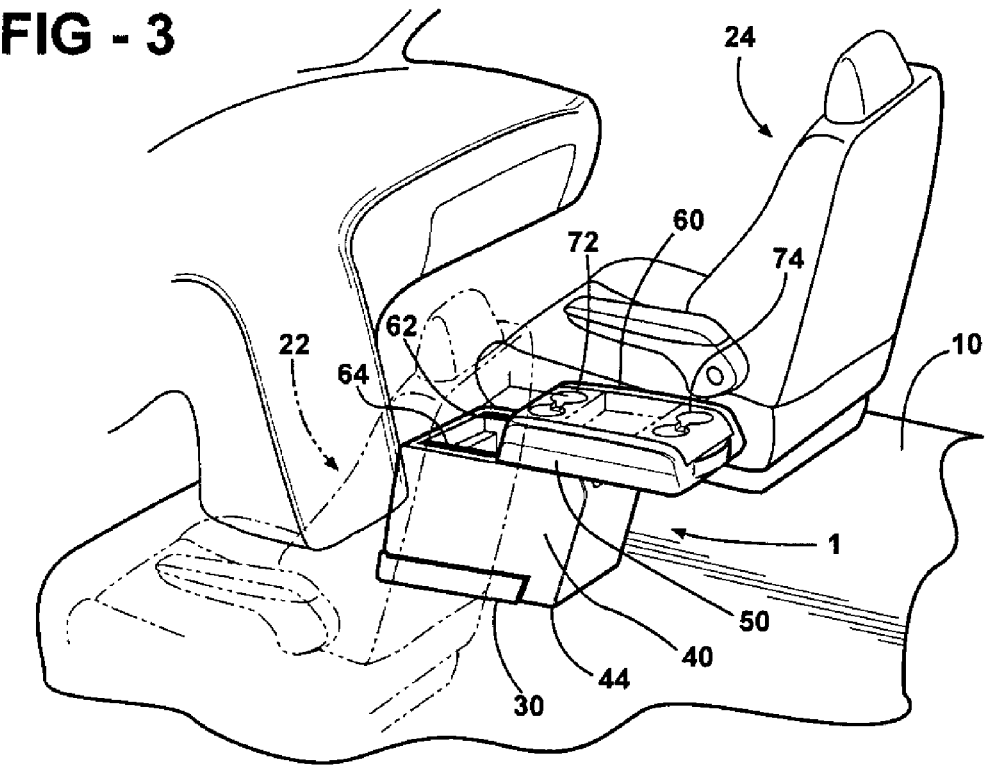
FIG. 3 is a perspective view of a storage console assembly for a motor vehicle according to an exemplary embodiment of the present invention.
Figure 5:
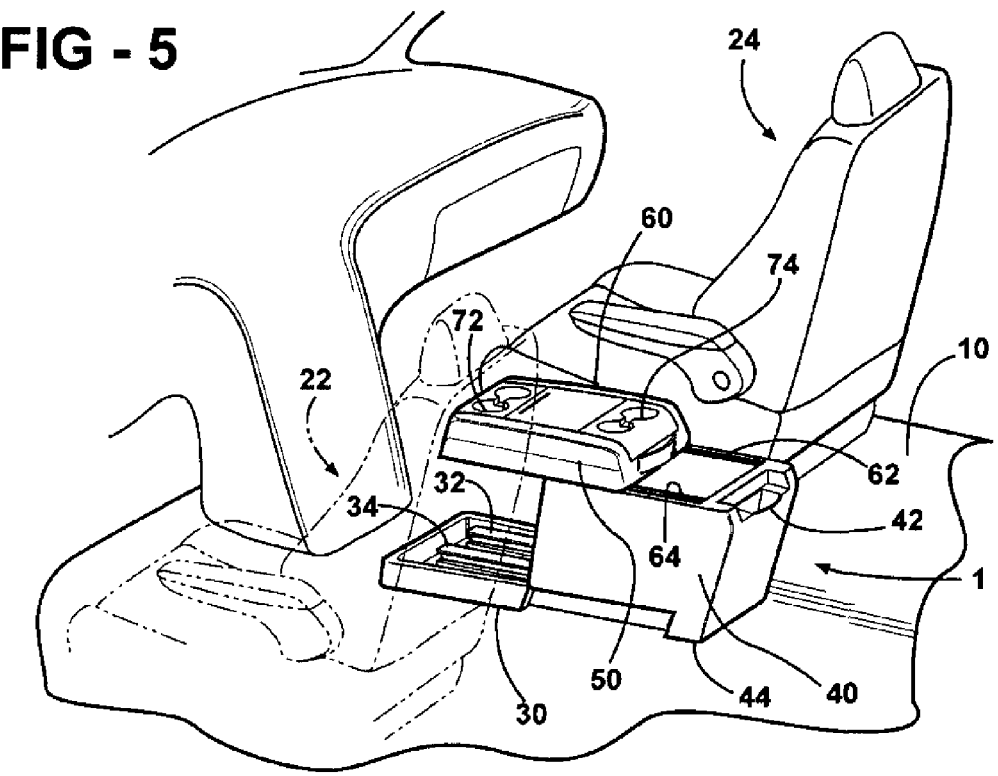
FIG. 5 is a perspective view of a storage console assembly for a motor vehicle according to an exemplary embodiment of the present invention.

Finally, there may be situations in which the passenger configuration within the vehicle requires that access to the upper body 50 of the storage console assembly 1 be provided to the front passenger seats 22 and 24, while access to the main body 40 is provided to the rear passenger seats 26 and 28. This may be accomplished, as shown in FIG. 5, by sliding the main body 40 along the lower rails to its rearward position and sliding the upper body 50 along the upper rails to its forward position. Likewise, there may be situations in which the passenger configuration within the vehicle requires that access to the upper body 50 be provided to the rear passenger seats 26 and 28, while access to the main body 40 is provided to the front passenger seats 22 and 24. This may be accomplished, as shown in FIG. 3, by sliding the main body 40 along the lower rails to its forward position and sliding the upper body 50 along the upper rails to its rearward position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An storage console assembly for a vehicle having a floor, said storage console assembly comprising:
    a bracket removably coupled to said floor of said vehicle;
    at least one lower rail attached to said bracket;
    a main body slidably engaged with said at least one lower rail, said main body having a top portion and a storage bin;
    at least one upper rail attached to said top portion of said main body; and
    an upper body having a top portion and at least one of a storage bin or a cupholder, said upper body slidably engaged with said at least one upper rail;
    wherein said main body is arranged to be moved longitudinally between forward and rearward positions of said main body within said vehicle with respect to said bracket and said upper body is arranged to be moved longitudinally between forward and rearward positions of said upper body within said vehicle with respect to said main body, and said assembly is positionable to:
        a rearward position in which said main body is in its rearward position with respect to said bracket and in which said upper body is in its rearward position with respect to said main body,
        a forward position in which said main body is in its forward position with respect to said bracket and in which said upper body is between its forward and rearward positions with respect to said main body and is aligned to cover the storage bin of the main body, and
        an intermediate position in which said main body is in its rearward position with respect to said bracket and in which said upper body is in its forward position with respect to said main body.

2. The storage console assembly of claim 1 wherein said main body further includes a handle for moving said main body longitudinally within said vehicle with respect to said bracket.

3. The storage console assembly of claim 2 wherein said handle is integrally formed in the main body.

4. The storage console assembly of claim 1 wherein said upper body includes a cover pivotally attached said top portion of said upper body for covering said storage bin.

5. The storage console assembly of claim 1 wherein said upper body further includes a handle for moving said upper body longitudinally within said vehicle with respect to said main body.

6. The storage console assembly of claim 5 wherein said handle is integrally formed in the upper body.

7. The storage console assembly of claim 1 wherein said main body further includes a lower lip arranged to rest on said floor.

8. A vehicle having a floor, said vehicle comprising:
    a storage console assembly, said storage console assembly further including:
        a bracket removably coupled to said floor of said vehicle;
        at least one lower rail attached to said bracket;
        a main body slidably engaged with said at least one lower rail, said main body having a top portion and a storage bin;
        at least one upper rail attached to said top portion of said main body; and
        an upper body having a top portion and at least one of a storage bin or a cupholder said upper body slidably engaged with said at least one upper rail;
    wherein said main body is arranged to be moved longitudinally between forward and rearward positions of said main body within said vehicle with respect to said bracket and said upper body is arranged to be moved longitudinally between forward and rearward positions of said upper body within said vehicle with respect to said main body, and said assembly is positionable to:

a rearward position in which said main body is in its rearward position with respect to said bracket and in which said upper body is in its rearward position with respect to said main body, a forward position in which said main body is in its forward position with respect to said bracket and in which said upper body is between its forward and rearward positions with respect to said main body and is aligned to cover the storage bin of the main body, and an intermediate position in which said main body is in its rearward position with respect to said bracket and in which said upper body is in its forward position with respect to said main body.

9. The vehicle of claim 8 wherein said main body further includes a handle for moving said main body longitudinally within said vehicle with respect to said bracket.

10. The vehicle of claim 9 wherein said handle is integrally formed in the main body.

11. The vehicle of claim 8 wherein said upper body includes a cover pivotally attached said top portion of said upper body for covering said storage bin.

12. The vehicle of claim 8 wherein said upper body further includes a handle for moving said upper body longitudinally within said vehicle with respect to said main body.

13. The vehicle of claim 12 wherein said handle is integrally formed in the upper body.

14. The vehicle of claim 8 wherein said main body further includes a lower lip arranged to rest on said floor.

* * * * *